June 23, 1964     W. B. GEHL     3,138,482
PEANUT FLOCONTROL SPRAYER
Filed Sept. 14, 1961
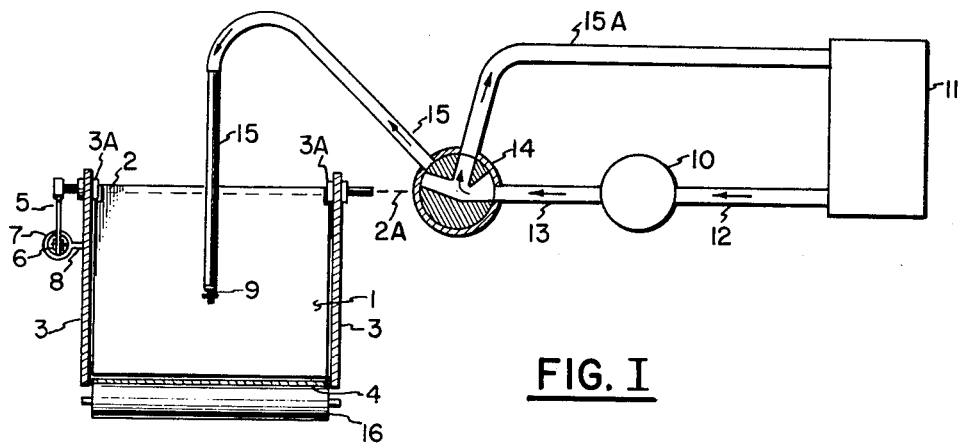
FIG. I
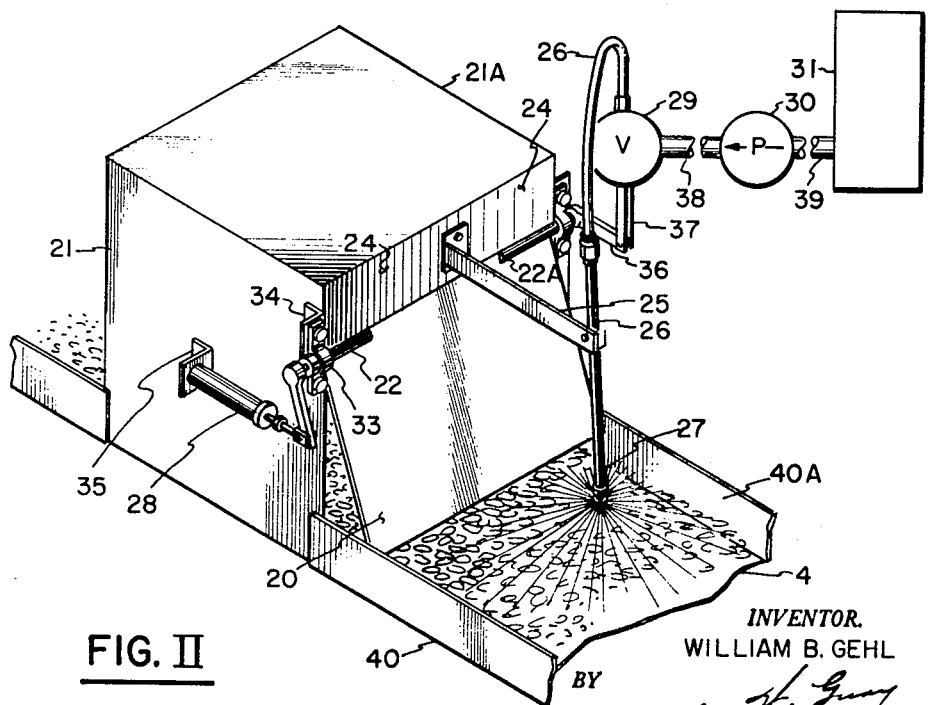
FIG. II
*INVENTOR.*
WILLIAM B. GEHL
BY
*ATTORNEY*

3,138,482
PEANUT FLOCONTROL SPRAYER
William B. Gehl, Hopewell, N.J., assignor to American Cyanamid Company, New York, N.Y., a corporation of Maine
Filed Sept. 14, 1961, Ser. No. 138,076
1 Claim. (Cl. 118—2)

This invention relates to an apparatus for the liquid treatment of homogeneous solids and to devices for carrying out this process. More particularly, the instant discovery concerns uniformly spraying a continuous stream of homogeneous solids, such as peanuts, the stream of solids being of non-uniform depth as it passes under a spray means.

The peanut industry, for example, has for years suffered a substantial loss due to the fact that upon storage peanuts are very vulnerable to insects. Since peanuts are generally stored in mounds it is extremely difficult to apply insecticide thereto. Consequently, better than one-third of the peanuts, particularly those at the bottom of these mounds, are infested, rendered non-edible and thrown away.

In spite of the voluminous market for peanuts in this country, particularly since the Civil War, no practical solution has even been found to the problem of peanut loss due to insect infestation. As just indicated, the biggest single problem is the fact that no convenient process or means has been devised for spraying these homogeneous solids. It is the nature of shell peanuts that a stream thereof moving on a continuous belt does not easily admit of uniform depth. This is so because of the fact that attempts to pass a stream of shell peanuts through a constricted opening, in order to provide a uniform stream thereof, invariably result in a complete interruption of the stream. Unlike grains and other fungibles, shell peanuts interlock, so to speak, and cease flowing when attempts are made to pass them through a constricting aperture.

Therefore, establishing a stream of shell peanuts of uniform depth in order to spray them at a constant, predetermined rate is not practical and is not consistent with fairly rapid transfer, storage and shipment of peanuts.

Pursuant to the instant discovery it has been found that a stream of peanuts of non-uniform depth may be sprayed uniformly, i.e., the amount of insecticide varying as the depth of the stream, without the difficulties attending the prior art. This is accomplished by the use of a uinque apparatus which comprises a substantially vertically-disposed gate, pivotally supported at its upper end to permit the lower end thereof to swing open in a direction toward a horizontal position, much as a removable storm window. The gate is disposed just above a floor-like surface passing under it and the bottom edge of the gate runs substantially parallel to and in relatively close proximity to the floor-like surface.

Preferably, the floor-like surface passing under the gate is the moving belt of a conveyor used to transfer the peanuts in a fairly steady stream from one area to another. The gate being in close proximity to the moving belt supporting the uneven stream of peanuts is forced open to allow the peanuts to pass therethrough.

A means responsive to the opening of said gate, such as a valve which is connected to the hinged portion of the gate, is provided. This means or valve is, in turn, in communication with a reservoir or other source of treating fluid fed via a pump to the valve and ultimately therefrom to a spray nozzle or other similar distributor. The nozzle is aimed to provide spraying of the peanuts just subsequent to their passing through the gate. By synchronizing the opening in the valve with the gate opening an amount of treating fluid proportionate to the depth of the peanuts is provided. Obviously, the rate of flow of homogeneous solids is a relevant factor which is considered when adjusting the concentration of treating fluid emitted at a given gate opening. This adjustment is readily predetermined.

It has been found, pursuant to the present invention, that a predetermined restraint on the movement of the gate, such as that afforded by a spring or a hydraulic valve, permits the gate, insofar as is possible without interrupting the flow of peanuts, to rake the peanuts to a more constant depth. By virtue of the fact that the peanuts must overcome a certain counter pressure provided by either a spring means, plunger-type pressure valve, weight distribution on the gate, or the like, the raking is made possible. It should be borne in mind, however, that any attempts to provide a stream of peanuts of uniform depth is defeated if the back pressure on this stream is such as to cause the shells to interlock and thus interrupt the total flow of peanuts. Therefore, it has been found that the range of variance in peanut depths can be controlled to some extent but not eliminated. By the same token, varying amounts of insecticide or other chemical fluid must be distributed downstream from the gate in order to provide the uniform concentration of insecticide required for a given depth of peanuts.

Means must be employed to direct the peanuts through the gate. By that is meant that retaining walls on each side of the stream of homogeneous solids must be provided to prevent the peanuts from avoiding the gate laterally, for instance, particularly as a result of the relatively slight back pressure created by the gate.

Typical means useful for delivering the treating fluid from a source or reservoir to a distributor are conventional gear pumps, rotary sliding vane pumps, centrifugal pumps, and the like.

Likewise, various valve means may be employed; typically a constant pressure outlet valve can be used. As will be obvious from the description, infra, a modified three-way valve is used in a preferred embodiment of the instant discovery. The skilled engineer will recognize obvious equivalents in feeding means, such as a gravity-feed hopper having a feed rotor, a blower, etc.

In the figures provided in the attached drawing there is shown, FIGURE I, the general arrangement of an illustrative apparatus embodying the invention; FIGURE II shows an enlarged view of a constructional form of the novel parts of the general arrangement according to the invention.

Referring to FIGURE I, vertically-disposed gate 1 is mounted on rod 2 which, in turn, is in hinged relationship with lateral, parallel walls 3 by means of bearings 3A. Passing under gate 1 is moving belt 4. Rod 2 cooperates with lever arm 5 which, in turn, is attached to plunger 6 of hydraulic valve 7 supported by bracket 8 which is mounted on wall 3. Valve 7 is adjustable to permit various tensions on gate 1, as more clearly envisioned from FIGURE II.

Spray nozzle 9 disposed on one side of gate 1 and pointing toward the upper surface of moving belt 4 is fed by means of pump 10 which draws from reservoir 11 through conduit 12, as indicated, and feeds into conduit 13 leading to valve 14 responsive to the movement of hinge 2.

When gate 1 is in the position shown, i.e., substantially vertically disposed, valve 14 is closed. Upon opening gate 1 valve 14 responds to the movement of hinge 2 and opens, thus feeding into conduit 15 leading to spray nozzle 9. Moving belt 4 is driven by roller 16, the latter being driven by a conventional means not shown.

Rod 2 cooperates at 2A in any conventional manner with valve 14. Mechanical, electric or other well known cooperating means may be employed. A lever arm connecting rod 2 and valve is suitable.

Referring to FIGURE II, which is a 3-dimensional view of a preferred embodiment of the present invention, gate 20 is mounted in hinged relationship with walls 21 and 21A by means of rods 22 and 22A, corresponding bearings 33 supported by brackets 34. Crossmember 24 running from wall 21 and opposite and corresponding wall 21A supports bracket 25 which, in turn, supports conduit 26 terminating in spray nozzle 27. Rod 22 of gate 20 has mounted thereon valve 28 supported on wall 21 by bracket 35. Rod 22A engages valve 29 through cooperating arms 36 and 37 as shown. Valve 29 is in communication via conduit 38 with pump 30 which, in turn, communicates with reservoir 31 via conduit 39. Walls 21 and 21A extend downstream, so to speak, from gate 20 (as shown) as rails 40 and 40A, respectively, a distance greater than that intervening the spray nozzle 27 and gate 20, thus permitting the width of the stream passing though gate 20 to be kept constant for uniform spraying. Obviously, the trough-like configuration of FIGURE I, above, serves the same purpose when walls 3 thereof are extended downstream from gate 1 to a point beyond the area contacted by the fluid emitted from spray nozzle 9.

As is evident from FIGURE I discussed hereinabove, a two-way valve 14 may be employed which is shown in FIGURE I in the closed position with respect to conduit 15 and nozzle 9 and in the open position relevant to return conduit 15A to reservoir 11. An advantage to this valve 14 is that any liquid used in reservoir 11 which tends to precipitate and clog conduits 12, 13 and 14 is kept under constant agitation. Furthermore, depending on the depth of homogeneous solids passing through gate 1, valve 14 can adjust automatically to an intermediate position allowing both partial recirculation through conduit 15A and partial distribution to conduit 15.

Since many liquid insecticides, fungicides, bacteriocides, etc., do manifest a tendency to precipitate on standing, the advantages inherent in valve 14 are manifold.

In operation, as is evident from FIGURE II, peanuts are fed through gate 20 on a moving belt, for example, thus raising gate 20 and opening valve 29. Open valve 29 releases an amount of fluid proportionate to the opening of gate 20, which fluid is emitted from nozzle 27 as shown. From the rate of flow of peanuts through gate 20 the concentration of insecticide required for a given depth of peanuts can be predetermined and pump 30 set to deliver this concentration. Obviously, an increase in depth at the same rate of peanut flow increases the amount only of fluid emitted at nozzle 27, the concentration of fluid per unit depth remaining uniform.

Another embodiment of the present invention comprises the use of a trough placed at an angle to permit the homogeneous solids to slide downwardly therein at a predetermined rate. A gate suspended therein through which the sliding solids are made to pass by forcing the gate open could occasion the same valve response depending upon the depth of the solids.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claim.

I claim:

An apparatus suitable for spraying a continuous stream of hard shell peanuts, said stream being of non-uniform depth which comprises in combination a horizontally moving belt driven by rollers and adapted to support a stream of peanuts, retaining walls extending upwardly at the sides of said moving belt, a substantially vertically disposed gate pivotally supported at its upper end and fitting between said retaining walls, the bottom edge of said gate being substantially parallel to the plane of said moving belt and in relatively close proximity to its upper surface, the width of said gate being at least coextensive with the width of said belt, means for providing a predetermined restraint on the movement of said gate and thereby causing it to rake, without an interruption in flow, the peanuts to a more constant depth, a valve providing communication between a fluid spray distributor and a source of said fluid and being so adapted as to respond in direct proportion to the opening of said gate thereby effecting the fluids' transfer from the source to the distributor which is located downstream from said gate.

References Cited in the file of this patent

UNITED STATES PATENTS

| | | |
|---|---|---|
| 1,258,322 | Doellinger | Mar. 5, 1918 |
| 3,059,566 | Grau | Oct. 23, 1962 |

FOREIGN PATENTS

| | | |
|---|---|---|
| 60,839 | Germany | Feb. 3, 1892 |
| 1,076,605 | Germany | Mar. 3, 1960 |